United States Patent [19]
Johanson

[11] Patent Number: 5,992,689
[45] Date of Patent: *Nov. 30, 1999

[54] VARIABLE FLOW RATE HOPPER TO REDUCE FEED PULSATION TO A DOWNSTREAM PROCESS

[75] Inventor: Jerry R. Johanson, San Luis Obispo, Calif.

[73] Assignee: Jr Johanson, Inc., San Luis Obispo, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/742,402

[22] Filed: Nov. 4, 1996

[51] Int. Cl.$^6$ ........................................................ B67D 5/06
[52] U.S. Cl. .............................. 222/63; 222/65; 222/503
[58] Field of Search .................................. 222/1, 52, 55, 222/56, 63, 65, 502, 503, 558, 504, 181.1

[56] References Cited

U.S. PATENT DOCUMENTS

| | | | |
|---|---|---|---|
| 1,850,589 | 3/1932 | Tourneau | 222/502 |
| 2,901,148 | 8/1959 | Cunningham et al. | 222/502 X |
| 3,072,295 | 1/1963 | Lovette | 222/504 |
| 3,145,057 | 8/1964 | Taggart | 222/502 X |
| 3,414,312 | 12/1968 | Garlinghouse | 222/504 X |
| 3,782,528 | 1/1974 | Burger et al. | 222/56 X |
| 3,876,121 | 4/1975 | Preikschat | 222/503 |
| 3,935,970 | 2/1976 | Spaw | 222/56 |
| 4,270,671 | 6/1981 | Arnold | 222/558 X |
| 4,354,622 | 10/1982 | Wood | 222/55 |
| 4,378,897 | 4/1983 | Kattelmann | 222/56 |
| 4,580,698 | 4/1986 | Ladt et al. | 222/55 |
| 4,793,512 | 12/1988 | Krauss | 222/55 X |
| 4,893,735 | 1/1990 | Lonardi | 222/504 X |
| 4,927,312 | 5/1990 | Meredith et al. | 222/504 X |
| 4,944,428 | 7/1990 | Gmur et al. | 222/55 |
| 4,958,741 | 9/1990 | Johanson | 220/83 |
| 4,971,228 | 11/1990 | Baker et al. | 222/558 X |
| 5,131,722 | 7/1992 | DeCap | 222/502 X |
| 5,361,945 | 11/1994 | Johanson | 222/145 |

*Primary Examiner*—Kenneth Bomberg
*Attorney, Agent, or Firm*—Daniel C. McKown

[57] ABSTRACT

Many types of processors of particulate materials operate more efficiently when they receive the particulate material in a steady stream. Most feeders tend to discharge in pulses. A hopper is interposed between the feeder and the processor. Surges in the feed rate are accumulated in the hopper, and lapses in the feed rate are compensated by the propensity of the hopper to discharge at a constant rate. Initiation of hopper flow is accomplished by use of a trap door. Mismatch between average feeder output rate and hopper discharge rate is corrected by use of an adaptive hopper having an outlet the size of which is slowly altered to maintain a constant amount of material in the hopper. A bypass hopper is used to control extremely variable input flow rates.

6 Claims, 7 Drawing Sheets

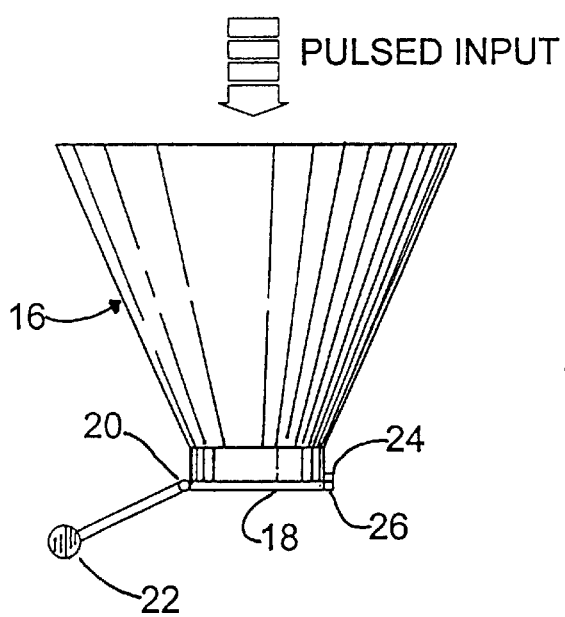
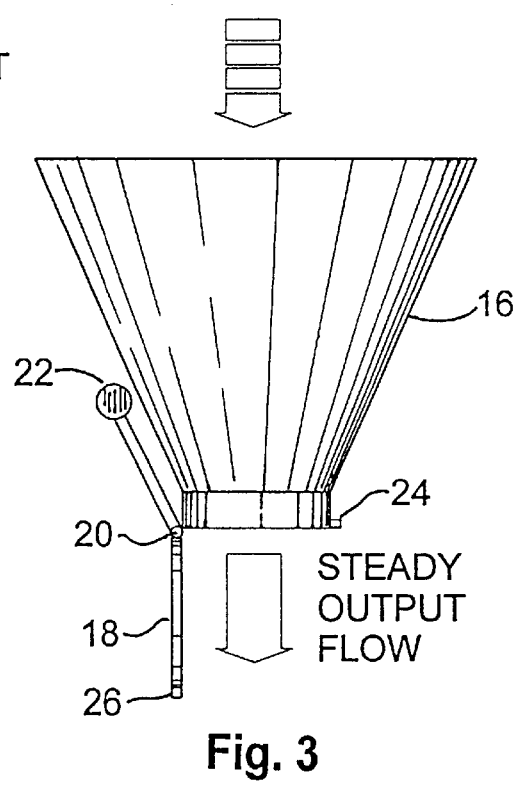
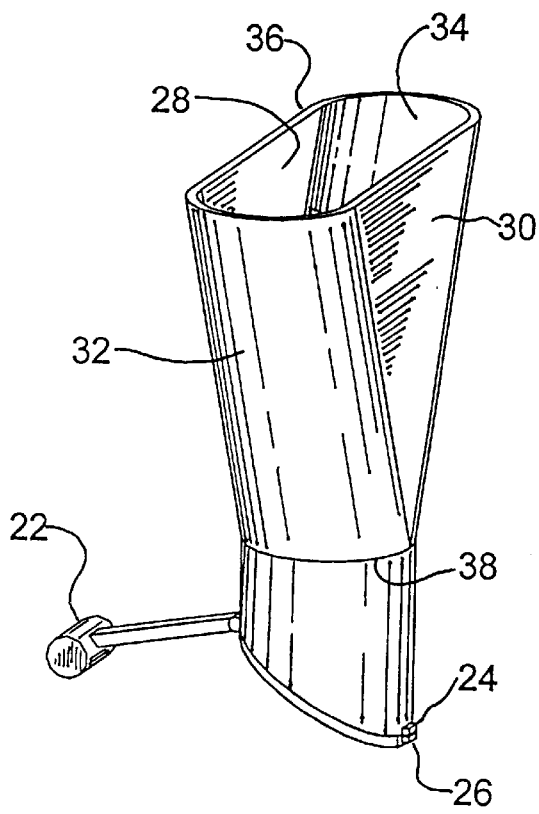
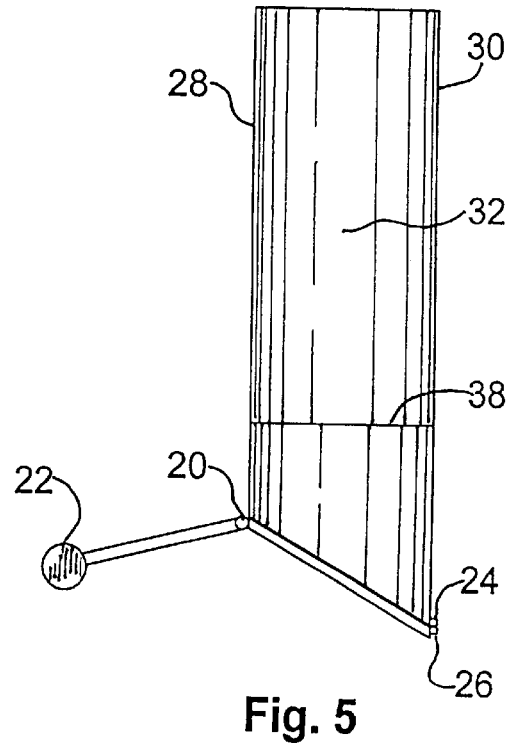
Fig. 2
Fig. 3
Fig. 4
Fig. 5

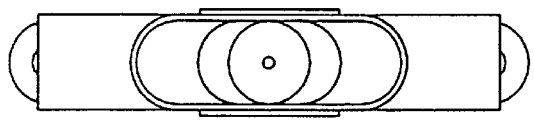
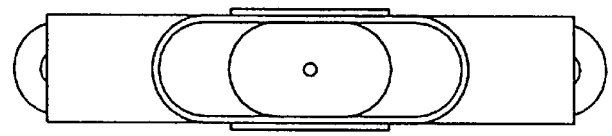
Fig. 12     Fig. 13
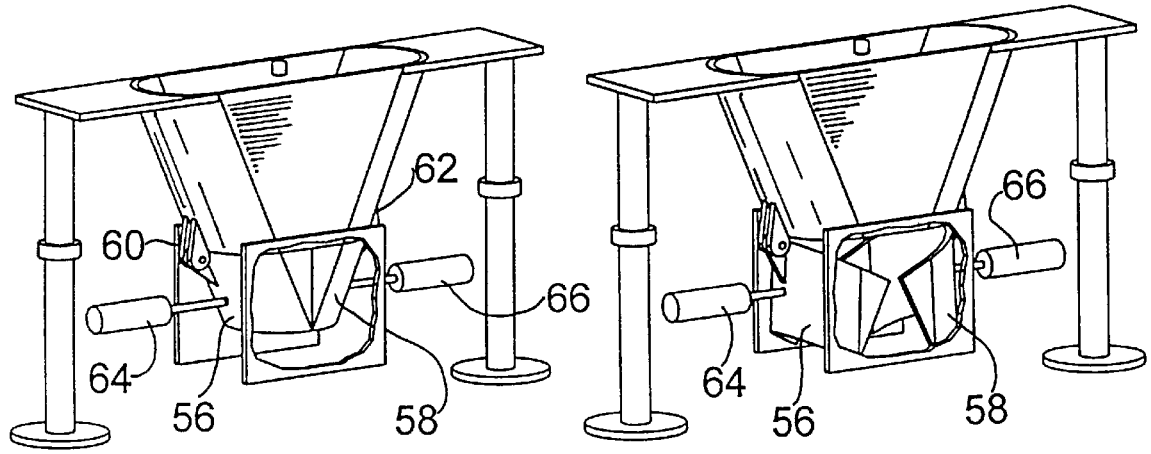
Fig. 10     Fig. 11

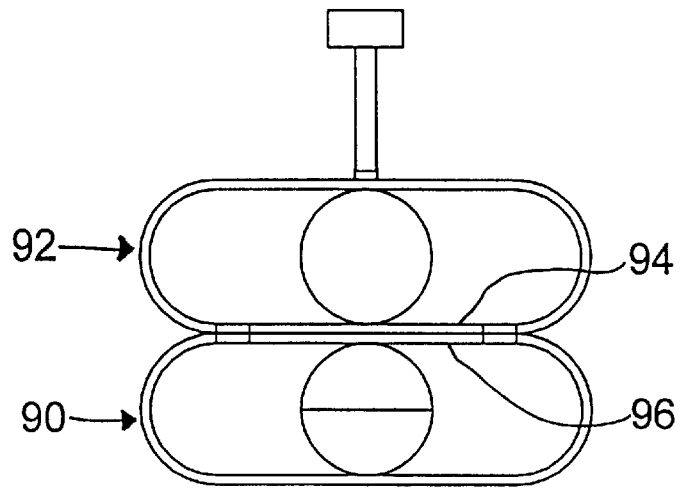
Fig. 18
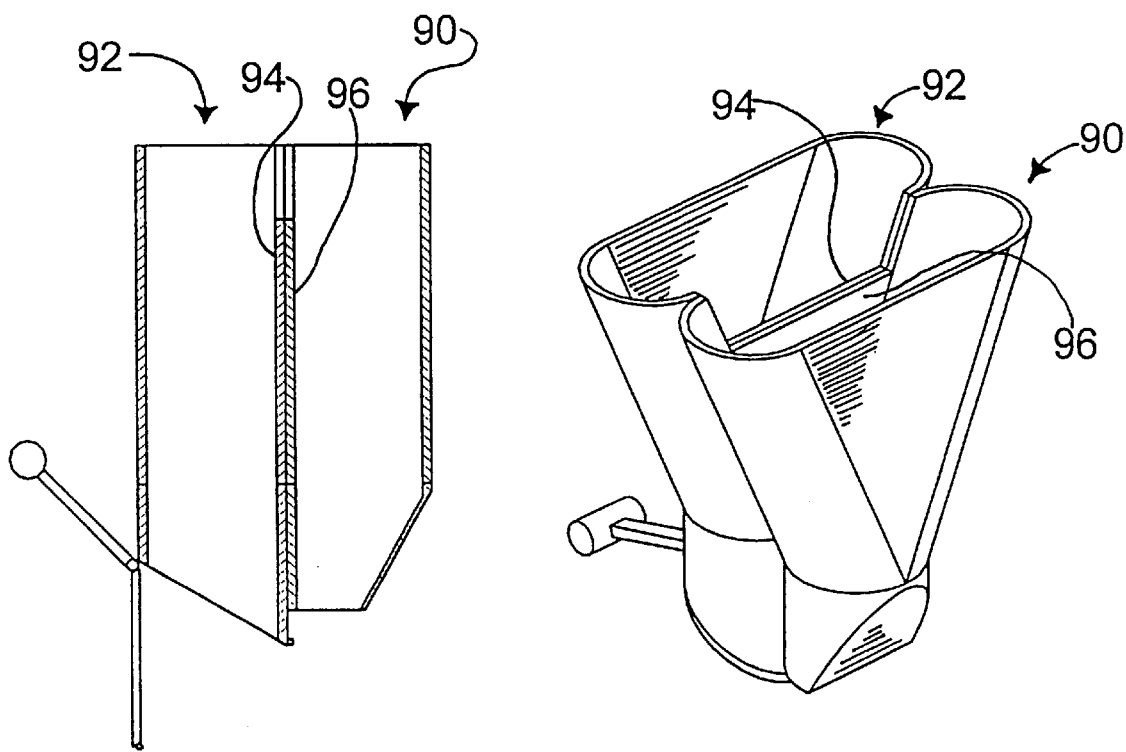
Fig. 17
Fig. 16

5,992,689

VARIABLE FLOW RATE HOPPER TO REDUCE FEED PULSATION TO A DOWNSTREAM PROCESS

BACKGROUND OF THE INVENTION

1. Field of the Invention

The present invention is in the field of engineering that deals with the flow of particulate materials and specifically relates to an apparatus for converting a fluctuating input flow into an output flow that is more uniform.

2. The Nature of the Problem

Many types of processing equipment for use with particulate materials—such as continuous screeners, grinders, pugmills, hammermills, blenders, crushers, mixers, and chemical reactors—work at improved efficiency if the flow of particulate material into them is at a constant rate rather than varying or pulsating. These processors are usually fed by a conveyor or feeder—such as a belt, screw, dragchain or flight conveyor. All of these feeders tend to discharge in pulses, as is particularly apparent when the material is supplied by a moving chain of buckets. The present invention interposes between the feeder and the fed processing equipment means for smoothing out the pulses and variations to provide a more uniform feed to the processing equipment, thereby improving its efficiency.

As used herein, the terms "chute" and "hopper" refer to the same apparatus; the distinction lies in how the apparatus is operated. As used herein, both converge downwardly.

When the apparatus is used as a converging chute, the incoming particles simply freefall or tumble through the apparatus, their lateral dispersion being limited by the walls of the apparatus. A pulsed input results in a pulsed output.

In contrast, in a partly full converging hopper, the discharge rate is determined by the slope of the walls and the size of the outlet, and therefore remains approximately constant regardless of how much material is in the hopper, and regardless of variations in the input stream.

Because the efficiency of the processing equipment is greatest when the incoming flow is at a constant rate, operation as a converging hopper is preferable to operation as a converging chute. However, operation as a hopper will not occur unless the mass of particles has accumulated to a minimum height above the outlet, so that the outlet cross section will always be filled with the particulate material. Unfortunately, the minimum height is not likely to be attained in an unaided hopper because the flow rate capacity of a chute is much greater—perhaps by a factor of 10—than the flow rate for operation as a hopper.

In a realistic situation, the chute/hopper apparatus is initially empty, and thereafter an irregular flow of input particles begins. A major problem addressed by the present invention is how to initially accumulate enough material in the chute/hopper apparatus so that operation as a hopper will be initiated.

Over an extended period of time the input must equal the output; otherwise, the hopper will eventually overflow or alternatively become empty. Once established, operation as a hopper is self-sustaining provided the average input flow rate equals the average output flow rate, assuming the variations in the input stream are not too extreme.

In practice neither the input flow rate nor the output flow rate is measured or sensed, and the present invention does not require such measurements. As will be explained in detail below, the present invention solves the problem of maintaining approximate equality between the average input flow rate and the average output flow rate.

THE PRIOR ART

The effect of various design parameters on the flow of particulate material from a hopper is discussed in U.S. Pat. No. 4,958,741 of the present inventor, titled "MODULAR MASS FLOW BIN" and issued Sep. 25, 1990. The design of one-dimensional hoppers, i.e., hoppers that converge downwardly in the side-to-side dimension but not in the front-to-back dimension, is discussed in U.S. Pat. No. 5,361,945 of the present inventor, titled "COMBINATION HOPPER" issued Nov. 8, 1994.

The present invention is ancillary to hoppers of the types described in the patents cited above. The present invention extends the usefulness of such hoppers; specifically, by adapting them for use in converting a fluctuating input flow into an output flow that is more uniform. Exactly how this is accomplished will be seen in greater detail in the embodiments described below.

SUMMARY OF THE INVENTION

The main objective of the present invention is to provide apparatus that converts a fluctuating incoming stream of particulate material into a uniformly flowing output stream. The steady output stream is more efficiently utilized by downstream processing equipment.

In accordance with the present invention, the apparatus includes a hopper that is interposed between a feeder and the downstream processing equipment so that surges in the feed rate are accumulated in the hopper and lapses in the feed rate are compensated by the propensity of the hopper to discharge at a constant rate.

Initially, the hopper is empty, and the incoming particles merely cascade through the apparatus. One of the problems overcome by the present inventor was how to get the hopper full enough initially so that hopper-type flow would continue.

In accordance with the present invention, the discharge opening of the hopper is initially blocked by a trap door that is preloaded into a closed position against the discharge outlet of the hopper. The trap door does not open until sufficient particulate material has accumulated in the hopper, at which point the weight of the particulate material overcomes the preloading force, thereby releasing the trap door and permitting hopper-type flow from the discharge opening.

In a preferred embodiment, a magnet is used to supply the preloading force. The magnetic force is effective only over a short distance, and therefore it was also necessary to solve the problem of how to close or reset the trap door after the flow from the hopper has ceased. In the preferred embodiment, this is reliably accomplished by a counterweight, which also urges the trap door to its closed position.

The discharge rate of a hopper is determined by the slope of the walls of the hopper and the size of the outlet of the hopper, and therefore remains approximately constant regardless of how much material is in the hopper, and regardless of variations in the input stream. Thus, an existing hopper will have a fixed discharge rate for the material with which it is used.

If the average incoming flow rate is greater than the discharge rate, the hopper will eventually overflow, thereby disturbing the constancy of the output flow. On the other hand, if the average flow of the incoming stream is less than the discharge rate of the hopper, the hopper will eventually become empty and will cease to operate as a hopper, but instead will operate merely as a chute wherein a pulsed input results in a pulsed output. In practice it is unlikely that the average flow rate of the incoming stream from the feeder will happen to equal the discharge rate of an existing hopper, and therefore one of the two undesirable outcomes will eventually occur when prior art apparatus is used.

The present inventor has solved this problem by providing means for altering the discharge rate of a hopper, and for altering the discharge rate in relation to the amount of particulate material in the hopper. In this way, the discharge rate of the hopper is gradually adjusted so that it equals the average incoming flow rate even if the average incoming flow rate varies.

In accordance with the present invention, the discharge opening of a one-dimensional hopper is increased by retracting the lowermost curved portion of the wall of the hopper along an upper section of the curved wall of the hopper. In another preferred embodiment, the lowermost curved portions of the hopper are hinged to an upper section of the hopper so that they can swing outward thereby enlarging the discharge outlet of the hopper.

Using these techniques, it is possible to alter the discharge outlet manually when a greater incoming flow rate is observed or anticipated. However, this requires an operator, and the operator may not be able to see how much material is in the hopper while simultaneously adjusting the discharge opening.

In accordance with the present invention, this difficulty has been overcome and the need for a human operator has been eliminated by providing an autonomous control system than alters the size of the discharge outlet in relation to the amount of particulate material in the hopper. In this approach, the amount of material in the hopper is sensed by optical or ultrasonic sensors mounted in the hopper which measure the depth of the material within the hopper. Alternatively, the amount of particulate material in the hopper is determined by sensing the weight of the partially-full hopper by means of weight-sensing load cells. In accordance with this approach, a feedback control system continually adjusts the size of the discharge outlet in such a way to maintain a constant amount of particulate material in the hopper.

The adaptive hopper thus created can operate unattended and can accommodate itself to a wide range of incoming flow rates. The cross sectional area of the discharge outlet can be altered by as much as a factor of three, and this provides an adequate degree of control for most situations.

Where the average incoming flow rate varies so drastically that the above-described adaptive hopper cannot cope with it, or in situations where the cost of the adaptive hopper cannot be justified, a further technique has been devised by the present inventor. In accordance with this aspect of the present invention, there is provided one or more bypass hoppers which receive and process the overflow from the main hopper. The main hopper, which receives the flow from the feeder, may be either a passive or an adaptive hopper, and likewise the bypass hopper may also be either passive or adaptive. Also, a second bypass hopper may be added to a first bypass hopper which has been added to the main hopper. The overflow from the main hopper flows into the first bypass hopper, and if the first bypass hopper becomes overwhelmed, the overflow from it enters the second bypass hopper.

In the detailed description given below, these various embodiments of the present invention will be discussed in greater detail with the help of a number of drawings. It should be remembered however, that the drawings are provided for the purpose of illustrating and exemplifying the invention, and are not intended to limit the scope of the invention.

BRIEF DESCRIPTION OF THE DRAWINGS

FIG. 2 is a diagram illustrating apparatus for initiating hopper-type flow;

FIG. 3 is a diagram showing the hopper of FIG. 2 in an open position;

FIG. 4 is a perspective view showing the technique of FIGS. 2 and 3 applied to a one-dimensional hopper;

FIG. 5 is a diagram showing the hopper of FIG. 4 in a side elevational view;

FIG. 10 is a diagram showing a perspective view of a one-dimensional hopper in which the lowermost portions are pivoted to permit the discharge outlet to be increased in size;

FIG. 11 is a perspective view showing the hopper of FIG. 10 with the hinged portions swung open to increase the discharge outlet cross sectional area;

FIG. 12 is a plan view of the hopper of FIG. 10;

FIG. 13 is a top plan view of the hopper of FIG. 11;

FIG. 16 is a diagram showing a perspective view of a bypass hopper in which two race-track shaped hoppers are employed;

FIG. 17 is a side elevational view partly in cross section of the bypass hopper of FIG. 16;

FIG. 18 is a top plan view of the bypass hopper of FIG. 16;

DETAILED DESCRIPTION OF THE PREFERRED EMBODIMENT

In a fairly common situation, a feeder 12 supplies particulate material to a processor 14. The efficiency of the processor is maximized when the particulate material is supplied to the processor 14 at a constant rate.

Unfortunately, many types of feeders are inherently incapable of producing a uniform output stream of particles.

Figure 1:
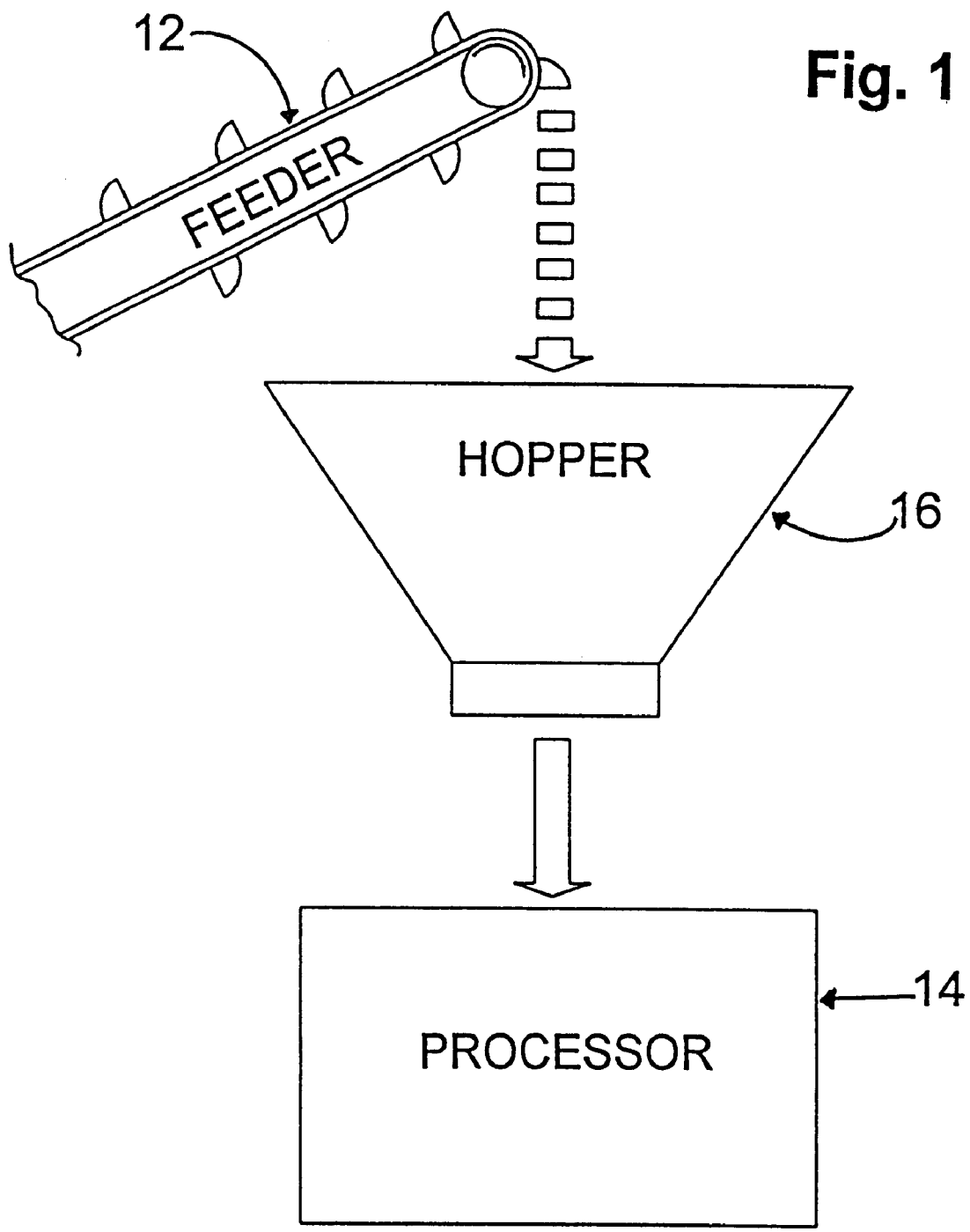
FIG. 1 is a diagram illustrating the use of a hopper to convert a fluctuating incoming flow from a feeder into a steady hopper discharge flow for use in a processor.
Figure 8:
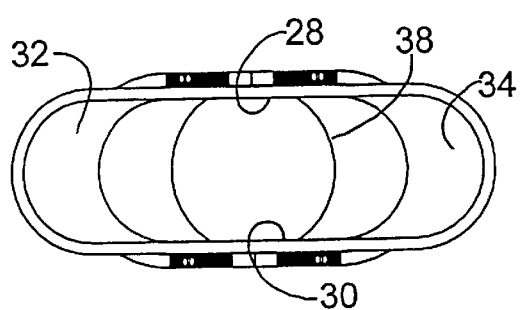
FIG. 8 is a top plan view of the hopper of FIG. 6 showing the outlet cross section.
Figure 9:
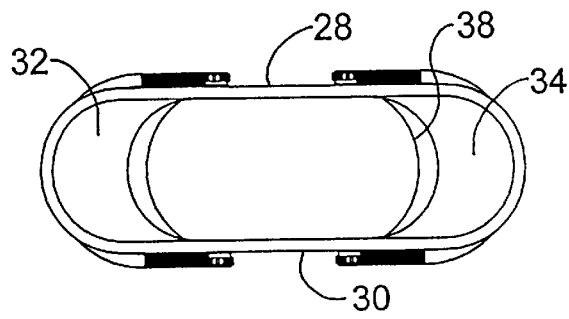
FIG. 9 is a top plan view of the hopper of FIG. 7 showing an enlarged discharge outlet.

The present inventor recognized that the variable flow of particles from the feeder 12 could be converted into a much more uniform flow of particles for use by the processor 14 by interposing a hopper 16 between the feeder and the processor, as shown in FIG. 1.

Although the drawings show several particular types of hoppers by way of example, the practicality of this basic concept does not depend on the shape of the hopper that is interposed; a cross section of the hopper in a horizontal plane may be circular, rectangular, or race-track shaped, to mention a few of the more common shapes.

It is well known that in a partly-full converging hopper, the discharge rate is determined by the slope of the walls and the size of the outlet, and therefore remains approximately constant regardless of variations in the input stream. A number of mechanical expressions of this underlying concept will be explored in the following paragraphs. As will be seen, to make the concept practical, a number of problems needed to be solved.

Initially, the hopper 16 is assumed to be empty. If the feeder is started, the particles supplied by the feeder will simply cascade down through the hopper, and the flow rate variations will not be smoothed. The hopper under these conditions is behaving as a chute, and the flow rate capacity of a chute is much greater than the flow rate that would result if the hopper were initially full. Thus, the first problem encountered is how to accumulate enough particulate material in the hopper 16 so that it behaves as a hopper rather than as a chute.

As shown in FIGS. 2 and 3, one solution to the problem of initiating hopper type flow is to provide the hopper 16 with a trap door 18 that opens and closes by rotating about a pivot 20. A counterweight 22 is provided, and its weight is sufficient to close the trap door after it has been opened. A first magnet 24 is affixed to the hopper, and a second magnet 26 is affixed to the trap door in registration with the first magnet. The poles of the magnets are oriented so that the magnets attract each other. A single magnet can be used if one of the parts is composed of a ferromagnetic material.

Initially the counterweight 22 and the magnets 24 and 26 are maintaining the trap door 18 in a closed position. Thereafter, the feeder is started, and the particulate material falls into the hopper. The combined forces of the counterweight and of the magnets prevent the trap door from opening until a substantial amount of particulate material is accumulated in the hopper. At some point the weight of the accumulated material overcomes the magnetic and counterweight forces, and the trap door falls open to the position shown in FIG. 3. The hopper then begins a steady output flow. If the flow ever stops, the counterweight will close the trap door, causing the magnets 24 and 26 to engage each other, thereby rendering the hopper ready for the resumption of flow and thereby completing a cycle of operation of the hopper.

In the example of FIGS. 2 and 3, the trap door 18 completely blocks the outlet of the hopper 16. The same result can be achieved in other embodiments wherein the trap door or other device does not completely block the outlet, but instead merely restricts the outlet to such a degree that particulate material accumulates in the hopper.

FIGS. 4 and 5 show how the trap door arrangement just described can be applied to a one-dimensional converging hopper. A one-dimensional converging hopper has a pair of flat walls 28 and 30 that are non-converging, alternating with a second pair of downwardly converging curved walls 32 and 34. A one-dimensional converging hopper makes a transition from a race-track cross section at the top 36 to a circular cross section at the bottom 38. A glance ahead at FIGS. 6–18 suggests that one-dimensional hoppers are ideally suited for practicing several aspects of the present invention.

For design purposes it is possible to think of the irregular flow of particles into the hopper as being comparable to the rainfall on a particular watershed over a number of years. The hopper can be thought of as a dam that impounds the rainfall and that releases it in a controlled steady stream. This analogy suggests that if the capacity or discharge rate of the hopper is too small, it will overflow on occasions, and one way to prevent this is to use a larger hopper. Unfortunately, in practice the possible size of the hopper may be limited by financial or physical restrictions. Thus, the present inventor looked for a way of extending the usefulness of smaller hoppers when larger hoppers cannot be used. Soon, he arrived at the concept of controllably increasing and decreasing the discharge rate of the hopper. Although theoretically this compromises the goal of maintaining a constant flow rate out of the hopper, in practical applications the efficiency of the processor 14 is not degraded because the variations in the hopper output are relatively slow and smooth.

The discharge rate of any hopper can be decreased by partially obstructing the outlet. It is well known in the art to insert a plate into the outlet perpendicular to the direction of flow of the particles for the purpose of partially blocking the flow. In another example, in the hoppers of FIGS. 2–5, the size and location of the counterweight 22 can be chosen in such a way that when the trap door 18 is open, it partially obstructs the flow. To the extent that the downward pressure of the particulate material at the outlet is related to the amount of material in the hopper, some degree of control may be obtained in this manner. However, the range of control obtainable by partially obstructing the outlet is rather limited; too much obstruction will cause the flow to cease, and even if the obstruction is removed altogether, the flow rate cannot be increased by this method beyond the flow rate of the unobstructed hopper, which is determined by the size of the outlet and the slope of the walls. If partial blocking of the outlet is used as a control mode and if the discharge rate is to be both increased and decreased above and below some nominal rate, the desired result can only be accomplished by equating the nominal rate with a partially obstructed outlet. This means that the hopper is operating most of the time at a fraction of its maximum discharge rate. Thus, controlling the discharge rate by partially obstructing the hopper outlet is a control mode of limited effectiveness and low efficiency.

Recognizing the limitations of this control mode, the present inventor turned his attention to searching for ways of controllably increasing the outlet cross sectional area, so as to attain greater discharge rates and a wider range of control.

Figure 6:
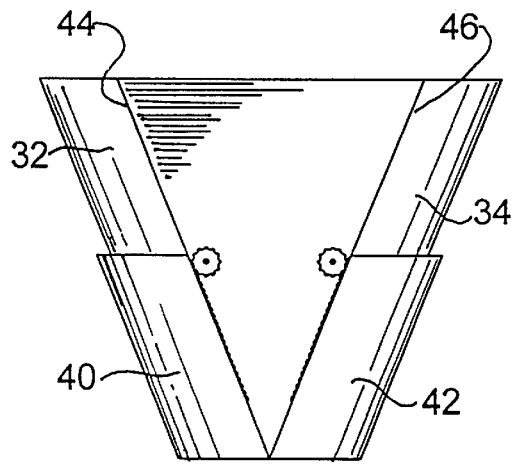
FIG. 6 is a diagram showing a front elevational view of a one-dimensional hopper set for a minimal rate of discharge.
Figure 7:
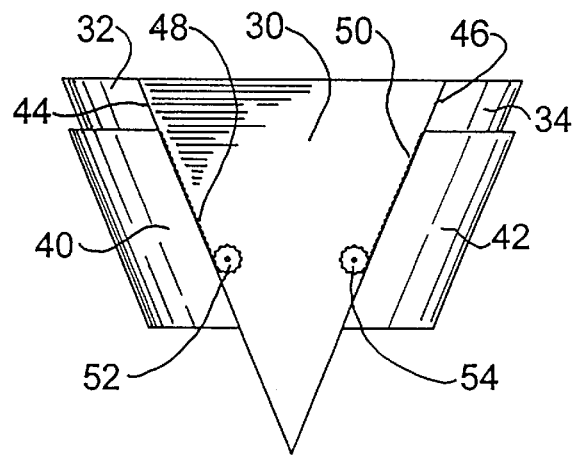
FIG. 7 shows the hopper of FIG. 6 set for a faster rate of discharge.

As is apparent from the one-dimensional hopper shown in FIG. 4, such a hopper has a first pair 28 and 30 of flat opposed walls, and a second set 32 and 34 of opposed curved walls. The curved walls, when viewed at their angle of inclination, have a constant cross section. The curved walls are shaped like semicircular troughs. The present inventor recognized that the discharge rate of a one-dimensional hopper can be increased by upwardly retracting the lowermost sections of the curved walls as shown in FIG. 7. In FIG. 6, the lowermost sections of the curved walls are in their lowest positions.

As best seen in FIG. 7, the V-shaped flat wall 30 of the hopper is provided with an outwardly directed flange that extends from its inclined edges. The lowermost sections 40 and 42 are provided with inwardly directed flanges that ride upon the outwardly directed flanges 44 and 46. Movement of the lowermost sections 40 and 42 is controlled by racks of 48 and 50 which are driven by pinions 52 and 54. As the lowermost sections 40 and 42 are raised, the flat wall 30 remains unmoved, and the outlet cross sectional area increases, as may be seen by comparing the top views of FIGS. 8 and 9.

FIGS. 10–13 show another technique for altering the discharge rate of a one-dimensional hopper. In accordance with this alternative embodiment, the lowermost sections 56 and 58 are connected to the remainder of the hopper by the hinges 60 and 62. This permits the lowermost sections 56 and 58 to swing outwardly as in FIG. 11 under control of the linear actuators 64 and 66. FIGS. 12 and 13 are top views of FIGS. 10 and 11 respectively, and FIGS. 12 and 13 show that the cross sectional area of the discharge outlet of the hopper can be increased by a factor of two or three by pivoting the lowermost sections outwardly.

From FIGS. 6–13 it is seen that the present invention goes far beyond earlier control techniques in which a plate or other object is inserted into the outlet to partially block it. In contrast, in the present invention the outlet remains unobstructed and the flow remains unimpeded.

The trap door 18 described above in connection with FIGS. 2–5 is used for starting hopper-type flow. The trap door can be used with the hoppers of FIGS. 6–13, because initially the outlets of those hoppers are at their minimum size. When used with these hoppers, the trap door provides the necessary restriction to initiate hopper-type flow. Once that flow has started, the outlets remain unobstructed.

Figure 14:
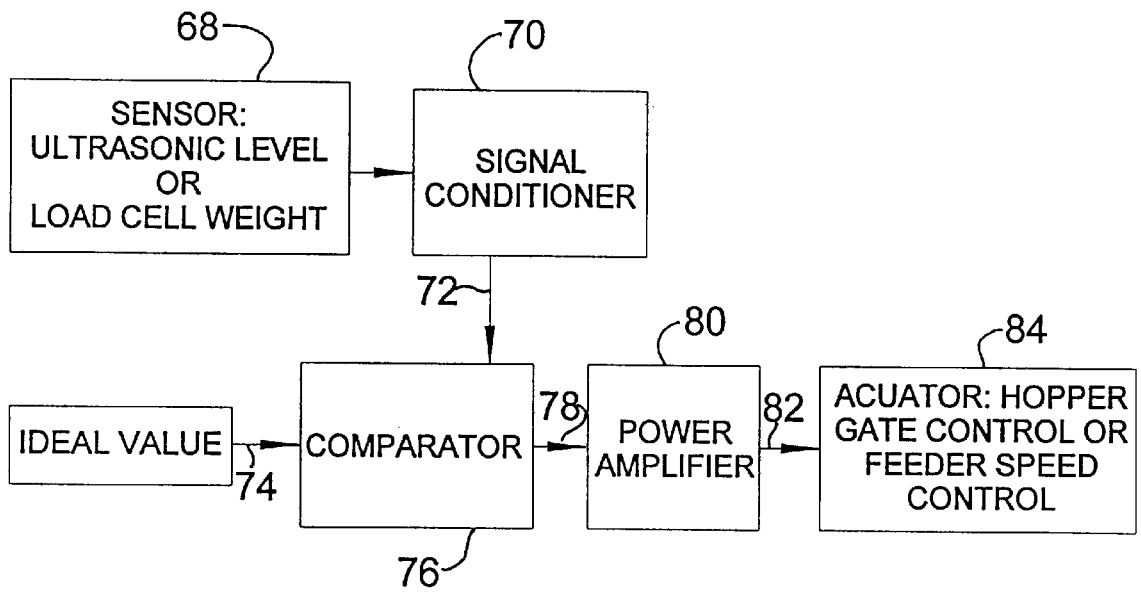
FIG. 14 is an electrical block diagram of a control system for use with an adaptive hopper.

Although in theory the cross sectional area of the discharge outlet of the hoppers of FIGS. 6, 7, 10 and 11 could be preset to yield a specific constant cross sectional area, the present inventor discovered that the usefulness of the hopper can be greatly extended if the discharge rate of the hopper is related to the amount of particulate material in the hopper by means of an automatic control system such as that of the preferred embodiment shown in FIG. 14.

The controller of FIG. 14 operates to maintain a constant amount of particulate matter in the hopper by controlling the discharge rate of the hopper as the input flow of particulate material to the hopper varies. The amount of particulate material in the hopper can be determined by an ultrasonic level sensor (98 of FIG. 15) or by a load cell weight sensor (88 of FIG. 15) which senses the weight of the partially-full hopper. Either or both types of sensors may be used. The output of the sensor 68 is applied to a signal conditioner 70 which smooths and amplifies the signal to render it compatible with the other signals in the system. The output of the signal conditioner 70 is representative of the depth of material in the hopper or the weight of the material in the hopper. This output signal on the line 72 is compared in the comparator 76 with a chosen constant ideal value on the line 74. The comparator 76 subtracts the ideal value from the actual value and provides an output signal on the line 78 representative of the difference. This difference signal on the line 78 is applied to the power amplifier 80 which produces on the line 82 an electrical signal that is powerful enough to operate an actuator 84 that controls the extent to which the lowermost sections of the hopper are opened.

Although the purpose and spirit of the present invention is to render the hopper adaptive to variations in the feed rate, it should be noted here that the output of the power amplifier 80 could be applied to alter the feed rate of the feeder.

By combining the controller of FIG. 14 with the variable outlet of FIGS. 6–13, there is produced an adaptive hopper that very gradually adjusts its discharge rate in response to long term variations in the feed rate and which produces a discharge rate that is insensitive to the short-term fluctuations of the incoming particle stream.

Figure 15:
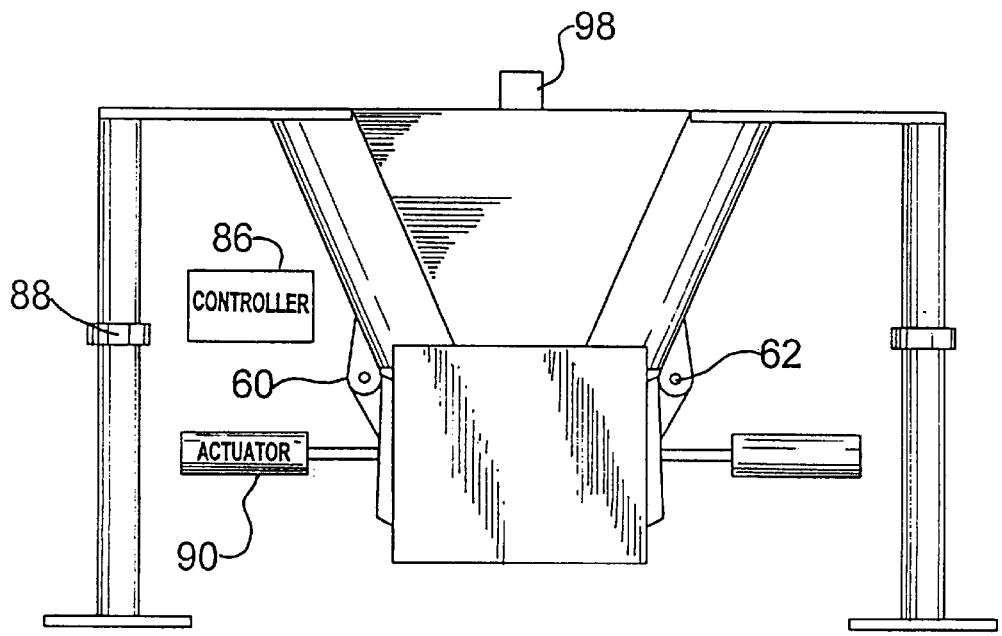
FIG. 15 is a diagram showing a front elevational view of a hopper employing the controller of FIG. 14.

FIG. 15 shows a controller 86 that accepts signals from the load cell 88 and that applies power to the actuator 90 to the control the opening and closing of the lowermost section of the hopper.

The adaptive hopper permits a practically constant flow of particulate material to the processor 14 (of FIG. 1) regardless of a wide range of fluctuations of the incoming particle stream delivered to the hopper by the feeder 12. When the adaptive hopper is used, the efficiency of the processor is greatly increased because the processor can operate with a practically constant input stream.

The bypass or multi-stage hopper of FIGS. 16, 17 and 18 can be used to extend the operating range of either a passive hopper or an adaptive hopper. In accordance with the preferred embodiment, a second hopper 90 is juxtaposed with a first hopper 92, and their touching walls 94 and 96 are shortened from their full height, so that the touching walls form a baffle or weir between the spaces within the first hopper 92 and the second hopper 90. The flow from the feeder is normally directed into the first hopper 92.

If the flow from the feeder is too great for the first hopper 92 to handle, the level of the particulate material in the first hopper will gradually build up until a point is reached at which some of the particulate material falls into the second hopper 90. When the material in the second hopper 90 reaches a predetermined depth, the trap door of the second hopper 90 opens and the second hopper also begins to discharge. This provides a combined discharge that is approximately twice that which could be obtained with a single hopper. In an alternative embodiment, the second hopper 90 is not provided with a trap door, in which case the second hopper functions as a chute to confine and direct the overflowing material into the processor, which is preferable to allowing the material to disperse.

Figure 19:
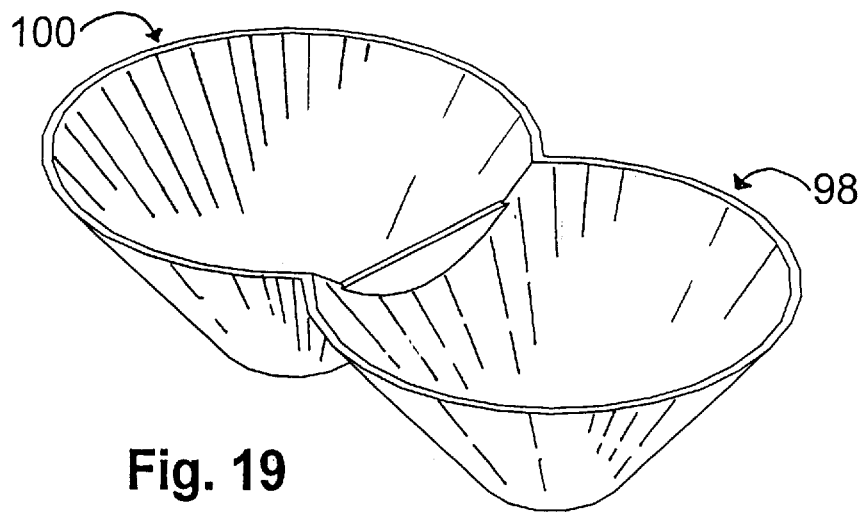
FIG. 19 is a diagram showing a perspective view of a bypass hopper in which two conical hoppers are employed.
Figure 21:
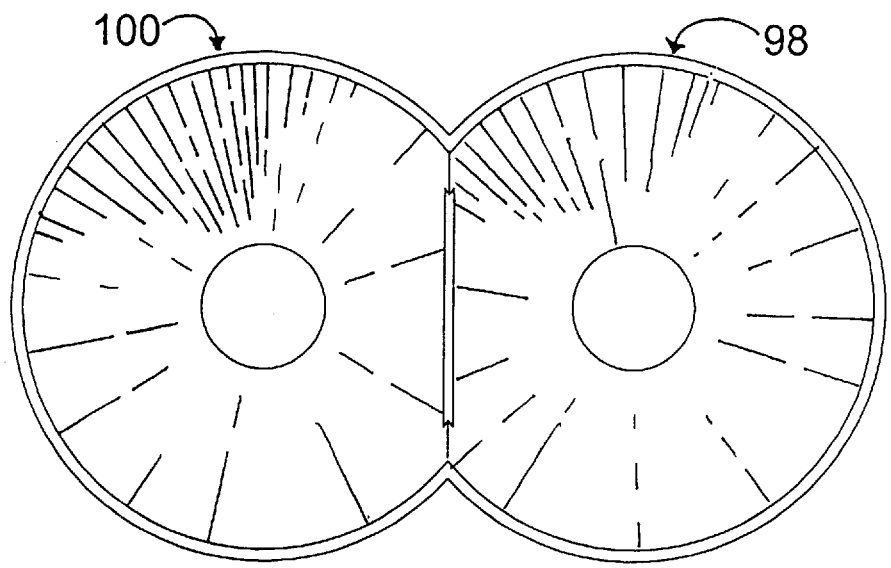
Figure 20:
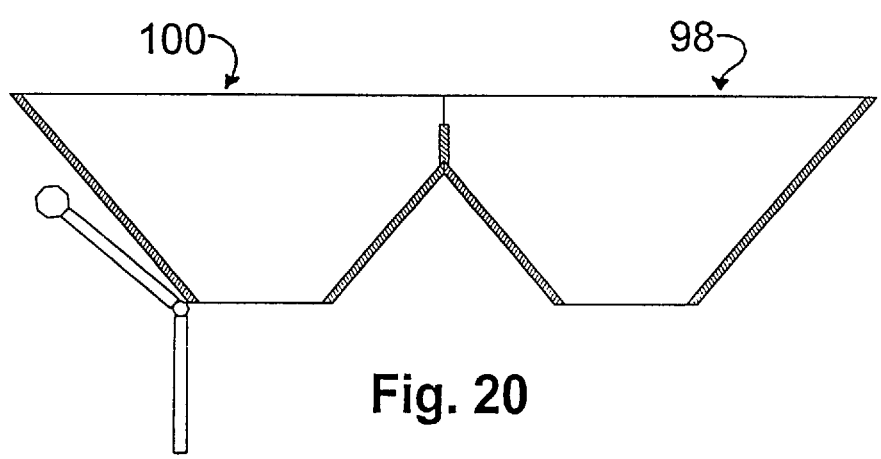
FIG. 20 is a side elevational view partly in cross section of the bypass hopper of FIG. 19; and, FIG. 21 is a top plan view of the bypass hopper of FIG. 19.

FIGS. 19–21 show that the overflow hopper concept can be implemented using conical hoppers 98, 100. As is the case with the embodiment of FIGS. 16–18, the provision of the overflow (second) hopper enables the combination to smooth a much wider range of input stream variations than is possible if only the first hopper is used.

In retrospect, a number of techniques have been described for smoothing variations in the output stream of a feeder to produce a constant or slowly varying input to a processor fed by the feeder. Where the input variations are relatively minor, a single hopper with a trap door can provide adequate smoothing. Larger variations of the input may necessitate the use of a hopper whose outlet area can be increased in relation to the amount of material in the hopper. For even larger variations in the input, a multi-stage (bypass) hopper can be used.

The foregoing detailed description is illustrative of several embodiments of the invention, and it is to be understood that additional embodiments thereof will be obvious to those skilled in the art. The embodiments described herein together with those additional embodiments are considered to be within the scope of the invention.

What is claimed is:

1. A hopper for particulate material, having a controllable discharge rate, and comprising:

walls that converge downwardly to a lower portion that includes an outlet of controllable size through which the particulate material flows continuously, said outlet having a minimum size corresponding to a minimum discharge rate; and, means for increasing the size of the outlet above said minimum size and for decreasing the size of the outlet, but not below said minimum size, so as to keep the outlet open at all times, whereby continuous flow is maintained and the flow may be controlled at rates exceeding the minimum discharge rate.

2. The hopper of claim 1 wherein said hopper has curved walls that converge downwardly in a first dimension and flat walls that do not converge downwardly in a second dimension that is orthogonal to the first dimension.

3. The hopper of claim 2 wherein said curved walls include lowermost sections and wherein said means for increasing and decreasing the size of the outlet further comprise means for sliding said lowermost sections along said curved walls.

4. The hopper of claim 3 further comprising means attached to said hopper for controlling the size of the outlet in relation to the amount of particulate material in said hopper.

5. The hopper of claim 2 wherein said curved walls include lowermost sections and upper sections, and wherein said means for increasing and decreasing the size of the outlet further comprise means for pivotally connecting said lowermost sections to said upper sections.

6. The hopper of claim 5 further comprising means attached to said hopper for controlling the size of the outlet in relation to the amount of particulate material in said hopper.

* * * * *